(12) United States Patent  
Pirrotta

(10) Patent No.: US 9,485,655 B1  
(45) Date of Patent: Nov. 1, 2016

(54) PROVIDING POWER CONTROL TO AN ELECTRONIC DEVICE USING AUTHENTICATION

(71) Applicant: EMC Corporation, Hopkinton, MA (US)

(72) Inventor: Joseph M. Pirrotta, Framingham, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 2 days.

(21) Appl. No.: 14/619,274

(22) Filed: Feb. 11, 2015

(51) Int. Cl.  
    *H04W 12/06*    (2009.01)  
    *H04W 64/00*    (2009.01)  
    *H04W 52/02*    (2009.01)  
    *G06F 21/32*     (2013.01)  
    *H04L 29/06*     (2006.01)  
    *G06F 21/88*     (2013.01)

(52) U.S. Cl.  
    CPC ......... *H04W 12/06* (2013.01); *H04W 52/0274* (2013.01); *H04W 64/00* (2013.01); *G06F 21/32* (2013.01); *G06F 21/88* (2013.01); *H04L 63/0861* (2013.01)

(58) Field of Classification Search  
    CPC ........... H04W 12/06; H04W 52/0274; H04W 64/00; G06F 21/32; G06F 21/88; H04L 63/0861  
    See application file for complete search history.

(56) References Cited

U.S. PATENT DOCUMENTS

| | | | |
|---|---|---|---|
| 7,848,746 B2 | 12/2010 | Juels | |
| 8,452,989 B1 | 5/2013 | Morneau et al. | |
| 8,495,372 B2 | 7/2013 | Bailey et al. | |
| 9,137,012 B2 | 9/2015 | Bailey et al. | |
| 2005/0021369 A1* | 1/2005 | Cohen | G06F 19/327 705/2 |
| 2006/0123240 A1* | 6/2006 | Chaiken | G06F 21/32 713/186 |
| 2008/0250510 A1* | 10/2008 | Stevens | G06F 21/70 726/35 |
| 2010/0099383 A1* | 4/2010 | Yamagishi | H04M 1/72538 455/411 |
| 2014/0364099 A1* | 12/2014 | Pai | H04L 63/08 455/418 |
| 2014/0366128 A1* | 12/2014 | Venkateswaran | H04L 63/08 726/19 |
| 2015/0074796 A1* | 3/2015 | Meir | G06F 21/32 726/19 |

\* cited by examiner

*Primary Examiner* — Barry Taylor  
(74) *Attorney, Agent, or Firm* — BainwoodHuang

(57) ABSTRACT

A technique provides power control for an electronic device. The technique involves receiving a "turn off" command from a user of the electronic device, the "turn off" command directing the electronic device to turn off. The technique further involves, in response to the "turn off" command, invoking an authentication operation to authenticate the user, the authentication operation providing an authentication result indicating whether the electronic device considers the user to be an authorized operator of the electronic device. The technique further involves performing a power control operation in response to the authentication result, the power control operation (i) powering down location identification circuitry when the authentication result indicates that the electronic device considers the user to be an authorized operator, and (ii) maintaining power to the location identification circuitry when the authentication result indicates that the electronic device considers the user not to be an authorized operator.

19 Claims, 5 Drawing Sheets

PROVIDING POWER CONTROL TO AN ELECTRONIC DEVICE USING AUTHENTICATION

BACKGROUND

A conventional smart phone includes cellular telephony circuitry (e.g., a microphone, a speaker, a cellular transceiver, etc.) to enable the smart phone owner to make cellular phone calls. Some smart phones further include a pixelated display screen and a global satellite positioning (GPS) circuit to enable the smart phone to further operate as a navigation device (e.g., by graphically rendering maps and directions) thus enabling the smart phone owner to travel to various desired destinations.

To operate the smart phone, the smart phone owner turns on the smart phone. Firmware within the smart phone loads an operating system which then makes a variety of smart phone applications (or apps) available. At this point, the smart phone owner is able to make cellular phone calls and operate the smart phone as a navigation device as well as perform other operations such as accessing email, viewing electronic content, and playing electronic games.

SUMMARY

With significant increases in the theft of smart phones, a variety of conventional anti-theft apps are now available. For example, one conventional anti-theft app enables the smart phone owner to send the smart phone a constant ring signal which directs the smart phone to continuously ring off the hook. Another conventional anti-theft app enables the smart phone owner to send the smart phone an erase signal which wipes data off of the smart phone remotely. Yet another app enables the smart phone owner to send the smart phone a locate signal which directs the smart phone to send an email containing the GPS location of the smart phone to the smart phone owner.

Unfortunately, there are deficiencies to the above-described smart phone apps. For example, all of the above-described smart phone apps can be defeated by simply turning off the smart phone. That is, once a smart phone is powered off, the smart phone is no longer able to carry out any of the above-described operations such as ringing off the hook, wiping data, and sending out an email containing the smart phone's GPS location. Accordingly, a thief that has infiltrated an area with many vulnerable smart phones may easily turn off the smart phones while collecting as many smart phones as possible.

In contrast to the above-described smart phone apps which are defeated by simply turning off the smart phone, improved techniques are directed to powering down an electronic device only after successful authentication. In particular, when a user provides a command to the electronic device to power down or turn off, the electronic device responds by performing an authentication operation to authenticate the user. If the user successfully authenticates, the electronic device completes the power down process. However, if the user does not successfully authenticate, the electronic device maintains power to location identification circuitry. Such operation enables a legitimate user to ascertain whether the electronic device has been stolen and, if so, enables remedial activity. That is, the location identification circuitry remains operational even if a thief attempts to turn the electronic device off and thus enables issuance of an alert, location tracking of the electronic device, collection of data, disablement of the electronic device, and so on. Such operation may be transparent to any thief, i.e., the thief may think that he/she has successfully powered down the electronic device even though the location identification circuitry of the electronic device remains on to enable law enforcement to take action.

One embodiment is directed to a method of operating an electronic device. The method includes receiving a "turn off" command from a user of the electronic device, the "turn off" command directing the electronic device to power down or turn off. The method further includes, in response to the "turn off" command, invoking an authentication operation to authenticate the user, the authentication operation providing an electronic power control authentication result indicating whether the electronic device considers the user to be an authorized operator of the electronic device. The method further includes performing a power control operation in response to the electronic power control authentication result, the power control operation (i) powering down location identification circuitry of the electronic device when the electronic power control authentication result indicates that the electronic device considers the user to be an authorized operator of the electronic device, and (ii) maintaining power to the location identification circuitry of the electronic device when the electronic power control authentication result indicates that the electronic device considers the user not to be an authorized operator of the electronic device.

In some arrangements, invoking the authentication operation to authenticate the user includes:
 (i) in response to the "turn off" command, prompting the user to input a user credential,
 (ii) after prompting the user, receiving a user credential from the user and performing an evaluation operation on the user credential to determine whether the user is an authorized operator of the electronic device, and
 (iii) outputting the electronic power control authentication result based on the evaluation operation to indicate whether the electronic device considers the user to be an authorized operator of the electronic device.

Examples of suitable user credentials include passwords, fingerprints, retina scans, eye scans, facial scans, voice scans, other biometrics, combinations thereof, and so on.

In some arrangements, the electronic device includes other circuitry (e.g., cellular phone circuitry, camera circuitry, protected databases, combinations thereof, etc.) which is different from the location identification circuitry. In these arrangements, performing the power control operation includes:
 (i) powering down both the location identification circuitry and the other circuitry of the electronic device when the electronic power control authentication result indicates that the electronic device considers the user to be an authorized operator of the electronic device, and
 (ii) powering down the other circuitry of the electronic device while continuing to provide power to the location identification circuitry of the electronic device when the electronic power control authentication result indicates that the electronic device considers the user not to be an authorized operator of the electronic device.

In some arrangements, the location identification circuitry includes global satellite positioning (GPS) circuitry and communications circuitry. In these arrangements, the method further includes, after powering down the other circuitry of the electronic device, (i) operating the GPS circuitry to provide geolocation data which identifies a current geolocation of the electronic device and (ii) operating the communications circuitry to send an electronic message from the electronic device to an external security server. The electronic message includes the geolocation data which identifies the current geolocation of the electronic device. Accordingly, if the electronic device is misplaced or stolen, the location of the electronic device can be remotely ascertained.

In some arrangements, the electronic device is an electronic mobile apparatus (e.g., a smart phone, a tablet, a laptop computer, etc.). In these arrangements, the communications circuitry includes a wireless transceiver of the electronic mobile apparatus.

In other arrangements, the electronic device is stationary computerized equipment (e.g., a desktop computer, a smart wireless printer, a smart television, smart stereo equipment, smart storage devices, and so on). In these arrangements, the communications circuitry includes a wireless transceiver of the stationary computerized equipment, perhaps dedicated for anti-theft purposes.

In yet other arrangements, the electronic device is vehicle (e.g., a smart car, a legacy vehicle equipped with a wireless computer or an enhanced navigation system, a drone, etc.). In these arrangements, the communications circuitry includes a wireless transceiver of the vehicle.

In some arrangements, receiving the user credential includes obtaining a set of current user authentication factors. Here, performing the evaluation operation may include:
 (i) performing a comparison operation between the set of current user authentication factors and a set of expected user authentication factors, and
 (ii) outputting a comparison result indicating whether the set of current user authentication factors matches the set of expected user authentication factors.

Alternatively, performing the evaluation operation may include:
 (i) performing a risk-based (or adaptive) authentication operation which provides an electronic numerical risk score indicating an overall measure of riskiness based on aggregating sub-scores resulting from individual evaluations of the current user authentication factors, and
 (ii) outputting, as the electronic power control authentication result, a "success" message when the electronic numerical risk score is less than a predetermined risk threshold to indicate that authentication is successful and a "fail" message when the electronic numerical risk score is greater than the predetermined risk threshold to indicate that authentication is unsuccessful.

Other forms of authentication are suitable for use as well such as knowledge-based authentication (KBA), authentication using one-time passcodes (OTPs), combinations thereof, and so on.

In some arrangements, the method further includes:
 (i) incrementing a counter which stores a current count of unsuccessful authentication attempts in response to each determination that the user is not an authorized operator of the electronic device, and
 (ii) resetting the counter in response to a determination that the user is an authorized operator of the electronic device.

Along these lines, the method further includes performing a remedial operation when the current count of unsuccessful authentication attempts stored by the counter reaches a predefined alarm or awareness threshold (e.g., three failed attempts, four failed attempts, five failed attempts, etc.). In some arrangements, the counter is automatically reset after a predefined amount of time has expired after the last authentication attempt (e.g., 10 minutes, 30 minutes, and hour, etc.).

In some arrangements, performing the remedial operation includes locking out the user to prevent the user from normally operating the electronic device until the electronic device receives a "proper reset" command. Accordingly, a thief would be unable to normally operate the electronic device due to failing to successfully authenticate while attempting to turn off the electronic device.

In some arrangements, the method further includes receiving, as at least part of the "proper reset" command, a reset credential which is different from the user credential and, in response to reset credential, resetting the counter and allowing the user to normally operate the electronic device. Along these lines, the user can electronically pair or dock the electronic device with other equipment which supplies a proper reset credential (e.g., a long password, a cryptographic key, a cookie, a certificate, etc.) to unlock the electronic device.

In some arrangements, performing the remedial operation includes transmitting an alert message from the electronic device to an external security server. Here, the alert message (i) identifies a current location of the electronic device and (ii) indicates that the counter which stores the current count of unsuccessful authentication attempts has reached the predefined threshold. Accordingly, if the electronic device is misplaced, the user will be able to find the electronic device. Moreover, if the electronic device was stolen, law enforcement may be able to locate and apprehend the person who stole the electronic device.

In some arrangements, the electronic device includes memory which stores firmware. In these arrangements, performing the remedial operation includes disabling the electronic device from performing an upgrade to the firmware until the electronic device receives a "proper reset" command. For example, a thief can be prevented from performing a device firmware upgrade (DFU) to deactivate or override the location identification features of the electronic device.

Another embodiment is directed to an electronic device which includes location identification circuitry, memory, and control circuitry coupled to the location identification circuitry and the memory. The memory stores instructions which, when carried out by the control circuitry, causes the control circuitry to:
 (A) receive a "turn off" command from a user of the electronic device, the "turn off" command directing the electronic device to turn off,
 (B) in response to the "turn off" command, invoke an authentication operation to authenticate the user, the authentication operation providing an authentication result indicating whether the electronic device considers the user to be an authorized operator of the electronic device, and
 (C) perform a power control operation in response to the authentication result, the power control operation (i) powering down the location identification circuitry of the electronic device when the authentication result indicates that the electronic device considers the user to be an authorized operator of the electronic device, and (ii) maintaining power to the location identification circuitry of the electronic device when the authentication result indicates that the electronic device considers the user not to be an authorized operator of the electronic device.

Yet another embodiment is directed to a computer program product having a non-transitory computer readable medium which stores a set of instructions to operate an electronic device. The set of instructions, when carried out by the electronic device, causes the electronic device to perform a method of:

(A) receiving a "turn off" command from a user of the electronic device, the "turn off" command directing the electronic device to turn off;

(B) in response to the "turn off" command, invoking an authentication operation to authenticate the user, the authentication operation providing an authentication result indicating whether the electronic device considers the user to be an authorized operator of the electronic device; and (C) performing a power control operation in response to the authentication result, the power control operation (i) powering down location identification circuitry of the electronic device when the authentication result indicates that the electronic device considers the user to be an authorized operator of the electronic device, and (ii) maintaining power to the location identification circuitry of the electronic device when the authentication result indicates that the electronic device considers the user not to be an authorized operator of the electronic device.

It should be understood that, in the cloud context, certain electronic circuitry such as various server equipment may be formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in providing power control to an electronic device using authentication.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to powering down an electronic device only after successful authentication. That is, when a user provides a command to the electronic device to power down or turn off, the electronic device responds by performing an authentication operation to authenticate the user. If the user successfully authenticates, the electronic device completes the power down process. However, if the user does not successfully authenticate, the electronic device maintains power to location identification circuitry. In some arrangements, less essential circuitry is placed in sleep mode to extend battery life, but the more critical location identification circuitry remains powered. Such operation enables a legitimate user to ascertain whether the electronic device has been stolen and, if so, enables remedial activity. That is, the location identification circuitry remains operational even if after a thief has attempted to turn off the electronic device and thus enables the electronic device to issue an alert, provide location tracking, collect data, disable certain features, etc.). Moreover, such operation may be transparent to any thief, i.e., the thief may be spoofed into thinking that he/she has successfully powered down the electronic device even though the location identification circuitry of the electronic device remains on to enable law enforcement to take action.

Figure 1:
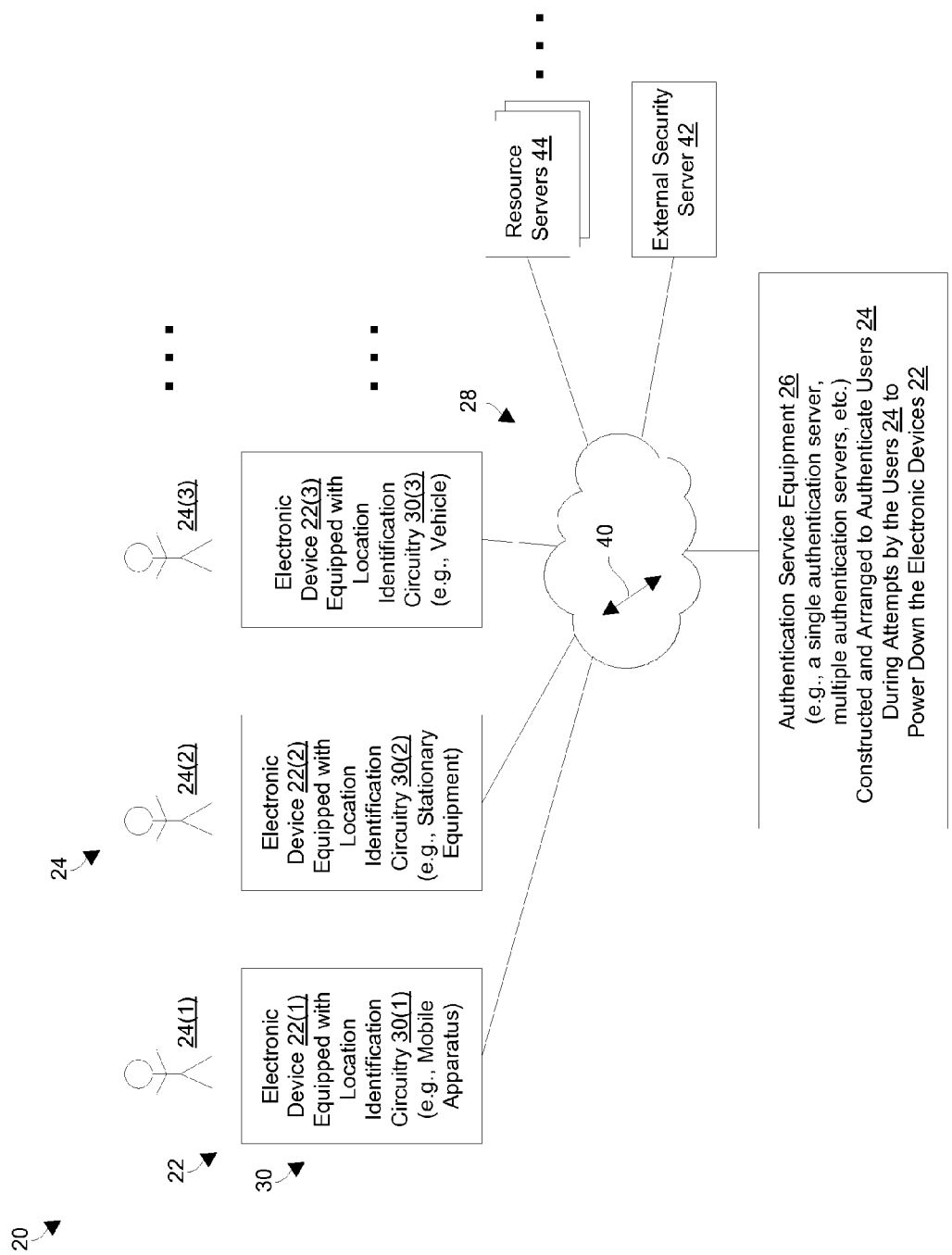
FIG. 1 is a block diagram of an electronic environment which supports providing power control to electronic devices using authentication.

FIG. 1 shows an electronic environment 20 which is suitable for providing power control to electronic devices using authentication. The electronic environment 20 includes electronic devices 22(1), 22(2), 22(3), . . . (collectively, electronic devices 22) which are operated by respective authorized users 24(1), 24(2), 24(3), . . . (collectively, authorized users 24), authentication service equipment 26, and communications medium 28.

Each electronic device 22 is equipped with, among other things, location identification circuitry 30 and enables its authorized user 24 to perform useful work. By way of example only, the electronic device 22(1) is a mobile apparatus such as a smart phone which includes, as at least a portion of location identification circuitry 30(1), a global satellite positioning (GPS) circuit which enables the smart phone to further operate as a navigation device. Also, by way of example only, the electronic device 22(2) is stationary equipment such as a smart television which includes, as at least a portion of location identification circuitry 30(2), a dedicated GPS circuit which enables location tracking of the stationary equipment. Likewise, by way of example only, the electronic device 22(3) is a vehicle such as a smart car which includes, as at least a portion of location identification circuitry 30(3), a GPS circuit which enables the smart car to drive itself to various destinations. There are other types of objects, equipment and apparatus which are suitable for the electronic devices 22 as well.

The authentication service equipment (or the simply authentication server) 26 is constructed and arranged to authenticate the users 24 (e.g., a single authentication server, a farm of authentication servers, specialized authentication devices partitioned by function, etc.) while the users 24 operate their respective electronic devices 22. It should be understood that further authentication may be required for the users 24 to access certain protected resources residing within the electronic devices 22 or on remote servers which communicate with the electronic devices 22.

The communications medium 28 is constructed and arranged to connect the various components of the electronic environment 20 together to enable these components to exchange electronic signals 40 (e.g., see the double arrow 40). At least a portion of the communications medium 28 is illustrated as a cloud to indicate that the communications medium 28 is capable of having a variety of different topologies including backbone, hub-and-spoke, loop, irregular, combinations thereof, and so on. Along these lines, the communications medium 28 may include copper-based data communications devices and cabling, fiber optic devices and cabling, wireless devices, combinations thereof, etc. Furthermore, the communications medium 28 is capable of supporting LAN-based communications, SAN-based communications, cellular communications, combinations thereof, etc.

It should be understood that the electronic environment 20 may include other components as well. In some arrangements, the electronic environment 20 includes an external security server 42 (e.g., to notify the authorized operator that an unauthorized user is attempting to turn off the electronic device, to alert law enforcement, etc.). In some arrangements, the electronic environment 20 includes other external servers 44 (e.g., data storage arrays, web servers, content servers, application servers, enterprise servers, virtual private networks, etc.), and so on.

During operation, the users 24 operate their respective electronic devices 22 to perform useful work. In order to fully turn off an electronic device 22, the authorized user 24 must successfully authenticate. Otherwise, the location identification circuitry 30 within the electronic device 22 remains turned on and operational to enable the electronic device 22 to perform the location tracking and remedial operations if the electronic device 22 is stolen. In particular, when a user 24 enters a "turn off" command, the electronic device 22 responds by invoking an authentication operation to authenticate the user 24. A result of the authentication operation indicates whether the electronic device 22 considers the user 24 to be an authorized operator of the electronic device 22.

In some arrangements, the electronic device 22 locally performs authentication of the user. In other arrangements, the electronic device 22 sends an authentication request to the authentication server 26 through the communications medium 28, and the authentication server 26 remotely performs authentication in response to the authentication request and returns the authentication result to the electronic device 22 through the communications medium 28.

Next, the electronic device 22 performs a power control operation based on the authentication result. In particular, the electronic device 22 powers down its location identification circuitry 30 when the authentication result indicates that electronic device 22 considers the user 24 to be an authorized operator (e.g., a legitimate user or owner). However, the electronic device 22 maintains power to the location identification circuitry 30 when the authentication result indicates that electronic device 22 considers the user 24 not to be an authorized operator. Further details will now be provided with reference to FIG. 2.

Figure 2:
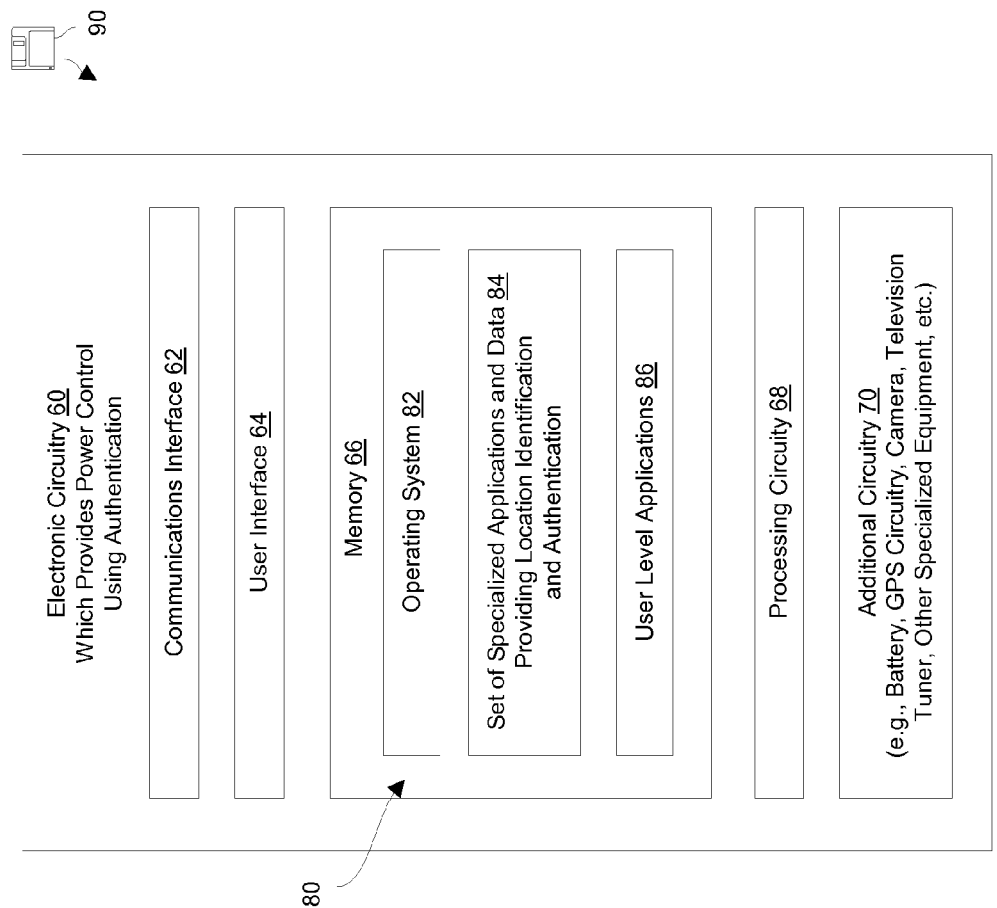
FIG. 2 is a block diagram of an electronic device of the electronic environment of FIG. 1.

FIG. 2 shows particular details of electronic circuitry 60 of an electronic device 22 of the electronic environment 20 (also see FIG. 1). The electronic circuitry 60 includes a communications interface 62, a user interface 64, memory 66, processing circuitry 68, and additional circuitry 70.

The communications interface 62 is constructed and arranged to connect the electronic device 22 to the communications medium 28 to enable communications with other components of the electronic environment 20 (FIG. 1). Such communications may be IP-based, cellular-based, cable-based, fiber-optic based, wireless, combinations thereof, and so on. Accordingly, the communications interface 62 enables the electronic circuitry 60 to robustly and reliably communicate with the authentication server 26 (FIG. 1) as well as other external equipment (e.g., other electronic devices 22, an external security server 42, resource servers 44, etc.).

The user interface 64 is constructed and arranged to receive user input from, and provide user output to a user 24 of the electronic device 22. In the context of a mobile device such as a smart phone, a tablet, etc., the user interface 64 can include, among other things, a touch screen or touchpad that receives coordinate selections in response to user touches, as well as other types of user gestures (e.g., swiping motions, multi-finger traces, etc.). In the context of stationary equipment such as a smart television or desktop computer, the user interface 64 can include a keyboard, a mouse, a remote controller, and so on. In the context of a vehicle, the user interface 64 can include a touch screen, dashboard and steering wheel controls, a microphone and speaker (i.e., vehicle voice activation), and so on.

The memory 66 is intended to represent both volatile storage (e.g., DRAM, SRAM, etc.) and non-volatile storage (e.g., flash memory, etc.). The memory 66 stores a variety of software constructs 80 including an operating system 82 to manage resources of the electronic circuitry 60, a set of specialized applications and data 84 to perform location identification and user authentication, and user level applications 86 to enable the user 24 of the electronic device 60 to perform useful work. In some arrangements, one or more of the specialized applications and/or data 84 is implemented in the form of firmware which, when run by the processing circuitry 68, causes the processing circuitry 68 to load the operating system 82 thus preventing a malicious user 24 from performing an unauthorized upgrade or modification in an attempt to defeat or circumvent power control using authentication.

The processing circuitry 68 is constructed and arranged to operate in accordance with the various software constructs 80 stored in the memory 66. Such processing circuitry 68 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software constructs 80 to the electronic circuitry 60. In particular, the computer program product 90 has a non-transitory (or non-volatile) computer readable medium which stores a set of instructions which controls one or more operations of the electronic circuitry 60. Examples of suitable computer readable storage media include tangible articles of manufacture and apparatus which store instructions in a non-volatile manner such as CD-ROM, flash memory, disk memory, tape memory, and the like.

The additional circuitry 70 represents other electronic portions of an electronic device 22. Along these lines, the electronic circuitry 60 further includes a battery or other power source which enables the electronic circuitry 60 to operate in different locations, GPS circuitry to identify a current geolocation of the electronic device 22, and so on. In the context of a smart phone, tablet, laptop computer or other mobile device, the additional circuitry 70 can further include a camera, a flashlight, and so on. In the context of stationary equipment, the additional circuitry 70 can further include specialized circuitry depending on the particular type of equipment such as a television tuner for a smart TV, high capacity storage for a smart storage drive, and so on. In the context of a vehicle, the additional circuitry 70 can further include vehicle electronics, and so on. Other circuitry is suitable for the additional circuitry 70, and other form factors are suitable for use as well.

During operation, a user 24 operates the electronic device 22 to perform useful work. For example, the user 24 can run one or user level applications 86 on the processing circuitry 68 to read email, access files, play games, and so on. Additionally, the set of specialized applications and data 84 runs on the processing circuitry 68 to form specialized control circuitry to perform various power control operations. Further details will now be provided with reference to FIGS. 3 through 5.

Figure 3:
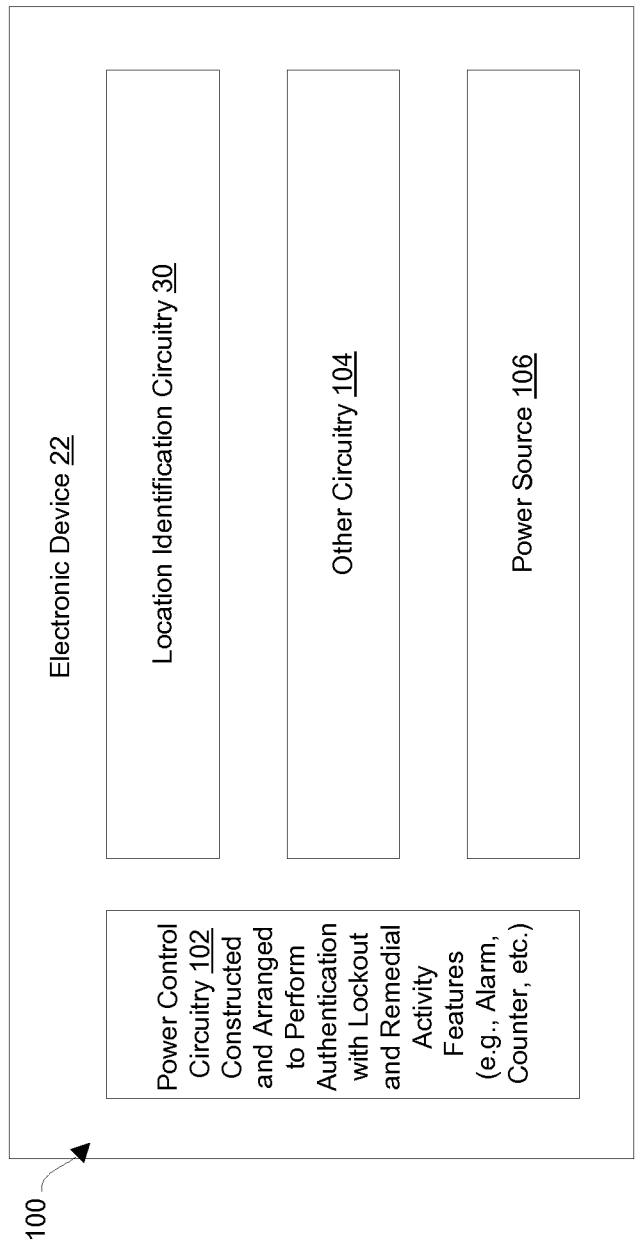
FIG. 3 is a block diagram of particular circuitry of the electronic device of FIG. 2 which are involved in power control.
Figure 4:
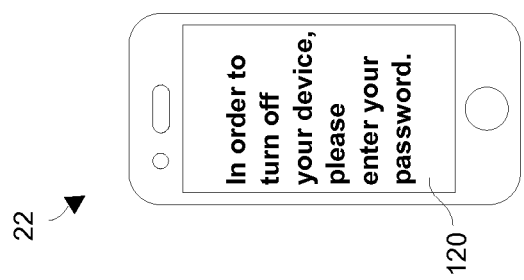
FIG. 4 is a block diagram of an example display of the electronic device 22 during user authentication.
Figure 5:
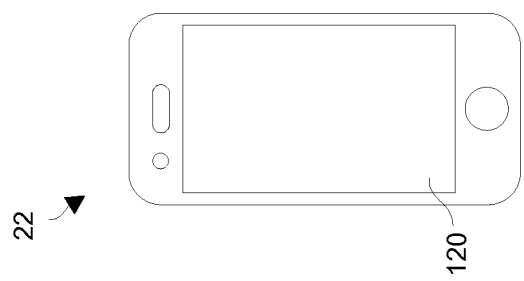
FIG. 5 is a block diagram of the example display of the electronic device 22 following user authentication.

FIGS. 3 through 5 provide further details of an electronic device 22 during operation. FIG. 3 shows particular circuitry 100 which is formed by the electronic device 22 when the processing circuitry 68 runs various software constructs 80 stored in the memory 66 (also see FIG. 2). FIG. 4 shows example display details of the electronic device 22 during user authentication. FIG. 5 shows example display details of the electronic device 22 following user authentication.

As shown in FIG. 3, the particular circuitry 100 of the electronic device 22 includes the earlier-mentioned location identification circuitry 30 (also see FIG. 1), power control circuitry 102, other circuitry 104, and a power source 106. The location identification circuitry 30 is formed by, among other things, the earlier-mentioned GPS circuitry (also see the additional circuitry 70 in FIG. 2) which identifies a current geographical location of the electronic device 22 and the communications interface 62 (FIG. 2). The power control circuitry 102 is formed by the processing circuitry 68 executing the set of specialized applications and data 84 (FIG. 2). The other circuitry 104 represents circuitry of the electronic device 22 which is not essential to identifying the location of the electronic device 22 and which can be put to sleep in order to conserve power (e.g., a camera of a smart phone, a television tuner of a smart television, the navigation system of a smart car, etc.). The power source 106 represents a rechargeable power supply (e.g., a battery pack) which stores power when the electronic device 22 is disconnected from a main power source (e.g., street power, generated electrical power from a combustion engine, etc.).

During normal operation, all of the circuitry 100 of the electronic device 22 is powered up and running. Accordingly, a user 24 of the electronic device 22 is fully operational and able to accomplish useful work.

At some point, the user 24 may wish to turn off the electronic device 22. For example, the user 24 may have completed his/her work and now wishes to power down the electronic device 22. As another example, if the user 24 is a thief, the user 24 may wish to turn off the electronic device 22 in order to defeat any anti-theft features of the electronic device 22.

To power down the electronic device 22, the user 24 provides a "turn off" command to the electronic device 22 (e.g., by pressing a control button, by entering a shutdown command, etc. via the user interface 62). The power control circuitry 102 responds by performing an authentication operation to authenticate the user 24. An electronic power control authentication result provided by the authentication operation determines which circuitry of the electronic device 22 is powered down and which circuitry continues to receive power.

In some arrangements, the user 24 expressly enters a user credential, e.g., by providing a password. FIG. 4 shows, by way of example, an electronic device 22 such as a smart phone which prompts the user 24 on a touchscreen 120 to enter a password in order to properly turn off the electronic device 22. Following such a prompt, the touchscreen 120 of the electronic device 22 renders a keyboard or number pad for the user 24 to enter a password. It should be understood that other types of passwords and input techniques are suitable for use as well such as providing swipes and other gestures on the touchscreen 120, providing a voice password (i.e., a voice biometric), and so on.

In other arrangements, entrance of the user credential is more incidental and/or automatic, e.g., by reading a fingerprint via a power control button, by scanning the user's face, etc. In yet other arrangements, combinations of authentication factors are acquired by the electronic device 22 to provide enhanced security (e.g., a password and biometrics, etc.).

Additionally, in some arrangements, the authentication operation is performed entirely locally by the electronic device 22. In other arrangements, the electronic device 22 communicates with the authentication server 26 (FIG. 1) to authenticate the user 24. Examples of suitable forms of authentication include single factor authentication, multifactor authentication, risk-based authentication, and so on.

For risk-based (or adaptive) authentication, a risk engine of the electronic device 22 or the authentication server 26 individually evaluates multiple authentication factors (e.g., biometrics, time of day, geolocation, etc.) to generate respective sub-scores and combines the sub-scores to provide, as an overall measure of riskiness, an aggregate risk score. If the aggregate risk score is less than a predetermined risk threshold, authentication is considered successful and the risk engine outputs, as the power control authentication result, a "success" message indicating that the user 24 is considered authentic, i.e., an authorized operator. However, if the aggregate risk score is greater than the predetermined risk threshold, authentication is unsuccessful and the risk engine outputs, as the power control authentication result, a "fail" message indicating that the user 24 is not considered to be an authorized operator.

The power control circuitry 102 of the electronic device 22 then performs a power control operation based on the power control authentication result. In particular, if authentication is successful, the power control circuitry 102 fully turns off the electronic device 22. That is, since the user 24 is the authorized operator, the power control circuitry 102 powers down the other circuitry 104 as well as the location identification circuitry 30. Of course certain traditional circuits may remain active such as an internal clock, voice activation circuitry, circuitry to respond to a remote controller, etc.

On the other hand, if authentication is unsuccessful, the power control circuitry 102 powers down only the other circuitry 104 but maintains power to the location identification circuitry 30. As a result, if the electronic device 22 is stolen, the thief is unable to completely turn off the electronic device 22 and the geolocation of the electronic device 22 can be ascertained remotely.

It should be understood that the power control circuitry 102 is capable of performing a variety of security-related operations if the user 24 is unable to successfully authenticate when trying to power down the electronic device 22. Along these lines, the power control circuitry 102 maintains a counter (also see the set of specialized applications and data 84 in FIG. 2) which stores a current count of unsuccessful authentication attempts in response to each determination that the user 24 is not an authorized operator of the electronic device 22. The power control circuitry 102 resets this counter in response to a determination that the user 24 is an authorized operator of the electronic device 22. The power control circuitry 100 may reset this counter after a certain amount of time has expired (e.g., five minutes, 10 minutes, etc.). If the current count of unsuccessful authentication attempts stored by the counter reaches a predefined threshold (e.g., four unsuccessful authentication attempts within five minutes), the power control circuitry 102 performs a set of remedial activities.

In some arrangements, the power control circuitry 102 locks out the user 24 to prevent the user 24 from normally operating the electronic device 22 until the electronic device 22 receives a "proper reset" command. An example of a proper reset command is a reset credential (e.g., a very long password, a cryptographic key, a certificate, etc.) which is different than the user credential. Such a reset credential can be delivered to the electronic device 22 by another electronic device of the authorized operator (e.g., via pairing with another secure computer, via a USB device, etc.). In response to the "proper reset" command, the power control circuitry 102 resets the counter and allows the authorized operator to normally operate the electronic device 22.

Another remedial activity includes transmission of an alert message (e.g., an automated email message, an automated phone call, etc.) from the electronic device 22 to an external security server (or central office) 42 (FIG. 1). The alert message may include important data such as a current location of the electronic device 22 and an indication that the counter which stores the current count of unsuccessful authentication attempts has reached the predefined threshold. It should be understood that other remedial activities are suitable of use as well such as ringing continuously, erasing protected data, combinations thereof, and so on.

It should be understood that, if the user 24 fails to authenticate while attempting to turn off the electronic device 22, the electronic device 22 may provide the appearance that the electronic device 22 is fully turned off even though the power control circuitry 102 and the location identification circuitry 30 is still powered up. As shown in FIG. 5, the other circuitry 104, such as the touchscreen 120 in the above-provided smart phone example, is powered down to conserve power in the power source 106. However, the power control circuitry 102 and the location identification circuitry 30 remain operational in order to report the current geolocation of the electronic device 22 to the external security server 42 (e.g., for law enforcement purposes). With the electronic device 22 providing a spoofed appearance of being fully power down, a thief is not tempted to disable and perhaps damage the electronic device 22 (e.g., by trying to open a case of the electronic device 22 and pry off the power source 106). Further details will now be provided with reference to FIG. 6.

Figure 6:
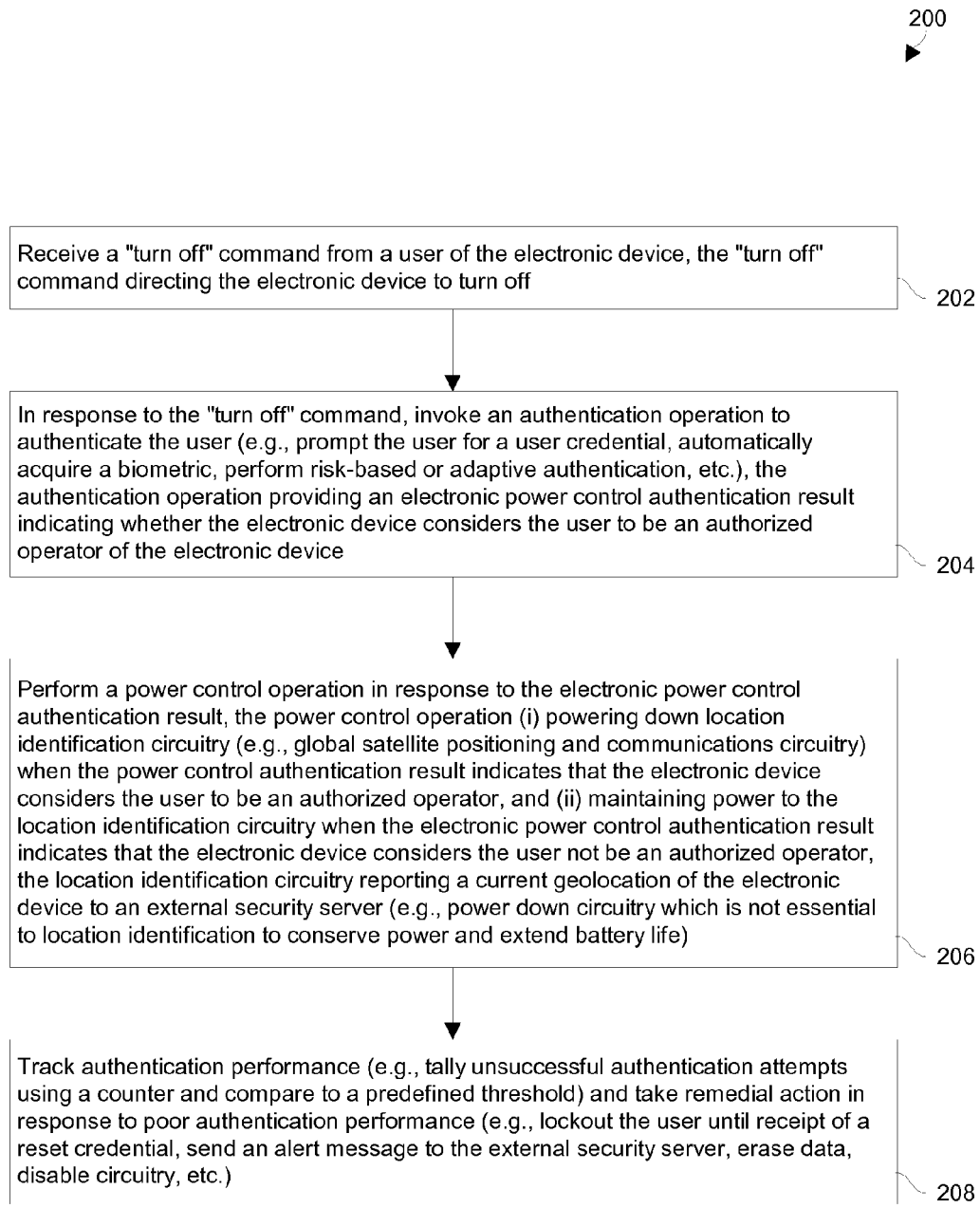
FIG. 6 is a flowchart of a procedure which is performed by the electronic device of FIG. 2.

FIG. 6 is a flowchart of a procedure 200 which is performed by an electronic device 22 when providing power control using authentication (also see FIG. 1). At 202, the electronic device 22 receives a "turn off" command from a user 24 of the electronic device 22. The "turn off" command directs the electronic device 22 to turn off At 204, the electronic device 22, in response to the "turn off" command, invokes an authentication operation to authenticate the user 24. A variety of different authentication techniques are suitable for use, e.g., prompting the user 24 for a credential, scanning a biometric (e.g., for fingerprint authentication, face recognition, voice recognition, etc.), performing risk-based or adaptive authentication, combinations thereof, and so on. The authentication operation provides an electronic power control authentication result indicating whether the electronic device 22 considers the user 24 to be an authorized operator of the electronic device 22.

At 206, the electronic device 22 performs a power control operation in response to the electronic power control authentication result. The power control operation (i) powers down location identification circuitry 30 of the electronic device 22 when the authentication result indicates that the electronic device 22 considers the user 24 to be an authorized operator of the electronic device 22, and (ii) maintains power to the location identification circuitry 30 of the electronic device 22 when the authentication result indicates that the electronic device 22 considers the user not to be an authorized operator of the electronic device 22. Accordingly, the location identification circuitry 30 is capable of reporting geolocation data to an external security server 42. Here, other circuitry 104 which is not essential to location identification can be powered down (e.g., put in sleep mode, etc.) in order to conserve power (e.g., extend battery life).

At 208, the electronic device 22 tracks authentication performance and taking remedial action in response to poor performance. Along these lines, the electronic device 22 tallies unsuccessful authentication attempts using a counter and compares the number of unsuccessful authentication attempts to a predefined threshold. If the predefined threshold is met, the electronic device 22 performs a set of remedial operations such as locking out the user 24 until the electronic device 22 is reset (e.g., until the electronic device 22 receives a reset credential), transmitting an alarm or alert to an external security server 42, erasing data, disabling circuitry, and so on.

As described above, improved techniques are directed to powering down an electronic device 22 only after successful authentication. In particular, when a user 24 provides a command to the electronic device 22 to power down or turn off, the electronic device 22 responds by performing an authentication operation to authenticate the user 24. If the user 24 successfully authenticates, the electronic device 22 completes the power down process. However, if the user 24 does not successfully authenticate, the electronic device 22 maintains power to location identification circuitry 30. Such operation enables a legitimate user to ascertain whether the electronic device 22 has been stolen (i.e., the location identification circuitry 30 remains operational even if a thief attempts to turn the electronic device 22 off) and, if so, enables remedial activity (e.g., issuance of an alert, location tracking of the electronic device, collection of data, disablement of the electronic device 22, etc.). Such operation may be transparent to any thief, i.e., the thief may be spoofed into thinking that he/she has successfully powered down the electronic device 22 even though the location identification circuitry 30 of the electronic device 22 remains on to enable law enforcement to take action.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic environment 20 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Furthermore, one will appreciate that the above-described techniques amount to more than merely authenticating a user before performing an operation. Rather, the techniques enable power to be maintained to location identification circuitry of an electronic device if the user does not successfully authenticate. As a result, the electronic device can be located while in the hands of thief and remedial action can be taken.

It should be understood that conventional electrical and electronic equipment are powered down with the press of a button or switch without regard as to who is powering down the equipment. Along these lines, with the market explosion and popularity of portable apparatus such as smart phones, laptops, and tablets, just to name a few, there has been a significant increase in theft of these apparatus. Vendors may respond by adding conventional device-tracking software and apps to the equipment that is GPS-capable. Such conventional tracking apps can be defeated by simply powering down the equipment thus taking the equipment off the grid and making it untraceable. This will give the thief plenty of time to collect as many apparatus as possible while they are in their untraceable state and perhaps ship them to a safe location in other parts of the world where the equipment could be opened and manipulated to become untraceable upon powering up.

Currently, most conventional portable apparatus are powered down by pressing and/or holding a power button. Many conventional apparatus are now prompting if the user wants to power down or put the apparatus to sleep, etc. After the user verifies his/her intent to shut off the apparatus, the operating system goes into a power-down routine thus shutting off the apparatus and taking it off the network grid.

In contrast, the above-described techniques prevent an electronic device from being power down without authentication of the rightful owner. Along these lines, power control circuitry can be implemented (e.g., processing circuitry running firmware) to control whether location identification circuitry within the electronic device continues to operate even after a user attempts to turn off the electronic device.

In some arrangements, rather than run a conventional power-down routine after a user signals that he/she intends to shut down, the electronic device executes a user authentication operation. In particular, when the user pushes the shut-off button, the electronic device can prompt if the user intends to shutdown. If the user replies "yes", the electronic device executes the authentication operation which prompts the user for some known credential such as a password, fingerprint, retinal scan, eye scan, voice scan or any other known and unknown methods of authentication.

In these arrangements, if the user enters the correct credential to properly authenticate, the electronic device executes its shut down routine and powers off. In case of a thief, he or she may more than likely enter the wrong code or other wrong credential. In this case, the electronic device allows a user-definable number of attempts and before going into a lockdown mode where the electronic device puts most of the unneeded features to sleep in order to save battery power. The electronic device stays on until the battery runs out, thus giving the theft victim a few more hours to try and trace the electronic device with the help of the law enforcement agencies. If the user replies 'cancel" or "no" to the power-down prompt, the electronic device remains on, but the electronic device raises security awareness until a number of user-defined attempts are reached and then also goes in lockdown mode. The heightened security awareness can be conveyed to external servers such as an authentication server which performs risk-based authentication (thus raising the riskiness of future authentication attempts), an external security server (to report an alarm), and so on. The only way to get out of lockdown mode is for the user to reset the electronic device by providing a "proper reset" command, e.g., by pairing the electronic device with another electronic device of the authorized operator that is provisioned with a special reset credential that the locked out electronic device recognizes.

In some arrangements, power control firmware prevents an unauthorized firmware upgrade that would otherwise circumvent the authentication requirement. Moreover, this feature is capable of directing the electronic device to work in conjunction with a third-party adaptive authentication service where the raised awareness that the electronic device might be in the wrong hands with each failed shut down attempt notifies the adaptive authentication service that the electronic device might be in the wrong hands combined with GPS location.

Furthermore, it should be understood that the above-described techniques are not limited to just mobile electronic devices. Rather, such techniques are applicable to any electronic device with integrated GPS and network capabilities and battery back-up. Along these lines, such techniques are suitable for desktop computers and apparatus, televisions, servers, array disc drives, appliances, electronic test equipment, cars, motorcycles, etc. as long as the electronic device has a GPS sensor, a battery backup, and traceability over a phone or public network. Other apparatus, equipment and form factors are suitable for use as well. Such modifications and enhancements are intended to belong to various embodiments of the disclosure.

What is claimed is:

1. A method of operating an electronic device, the method comprising:
    receiving, by the electronic device, a "turn off" command from a user of the electronic device, the "turn off" command directing the electronic device to turn off;
    in response to the "turn off" command, invoking, by the electronic device, an authentication operation to authenticate the user, the authentication operation providing an electronic power control authentication result indicating whether the electronic device considers the user to be an authorized operator of the electronic device; and
    performing, by the electronic device, a power control operation in response to the electronic power control authentication result, the power control operation (i) powering down location identification circuitry of the electronic device when the electronic power control authentication result indicates that the electronic device considers the user to be an authorized operator of the electronic device, and (ii) maintaining power to the location identification circuitry of the electronic device when the electronic power control authentication result indicates that the electronic device considers the user not to be an authorized operator of the electronic device;
    wherein invoking the authentication operation to authenticate the user includes:
    in response to the "turn off" command, prompting the user to input a user credential,
    after prompting the user, receiving the user credential from the user and performing an evaluation operation on the user credential to determine whether the user is an authorized operator of the electronic device, and outputting the electronic power control authentication result based on the evaluation operation to indicate whether the electronic device considers the user to be an authorized operator of the electronic device;

the method further comprising:

incrementing a counter which stores a current count of unsuccessful authentication attempts in response to each determination that the user is not an authorized operator of the electronic device, resetting the counter in response to a determination that the user is an authorized operator of the electronic device, and performing a remedial operation when the current count of unsuccessful authentication attempts stored by the counter reaches a predefined threshold;

wherein the electronic device includes memory which stores firmware; and wherein performing the remedial operation includes:

disabling the electronic device from performing an upgrade to the firmware until the electronic device receives a "proper reset" command.

2. A method as in claim 1 wherein the electronic device includes other circuitry which is different from the location identification circuitry; and wherein performing the power control operation includes:

(i) powering down both the location identification circuitry and the other circuitry of the electronic device when the electronic power control authentication result indicates that the electronic device considers the user to be an authorized operator of the electronic device, and (ii) powering down the other circuitry of the electronic device while continuing to provide power to the location identification circuitry of the electronic device when the electronic power control authentication result indicates that the electronic device considers the user not to be an authorized operator of the electronic device.

3. A method as in claim 2 wherein the location identification circuitry includes global satellite positioning (GPS) circuitry and communications circuitry; and wherein the method further comprises:

after powering down the other circuitry of the electronic device, operating the GPS circuitry to provide geolocation data which identifies a current geolocation of the electronic device and operating the communications circuitry to send an electronic message from the electronic device to an external security server, the electronic message including the geolocation data which identifies the current geolocation of the electronic device.

4. A method as in claim 3 wherein the electronic device is an electronic mobile apparatus; wherein the communications circuitry is a wireless transceiver of the electronic mobile apparatus; and wherein operating the communications circuitry includes:

transmitting the electronic message from the wireless transceiver of the electronic mobile apparatus to the external security server.

5. A method as in claim 4 wherein receiving the user credential includes obtaining a set of current user authentication factors;

wherein performing the evaluation operation includes:

performing a comparison operation between the set of current user authentication factors and a set of expected user authentication factors, and outputting a comparison result indicating whether the set of current user authentication factors matches the set of expected user authentication factors; and wherein performing the remedial operation further includes:

transmitting an alert message from the electronic device to the external security server, the alert message (i) identifying the current geolocation of the electronic device and (ii) indicating that the counter which stores the current count of unsuccessful authentication attempts has reached the predefined threshold.

6. A method as in claim 3 wherein the electronic device is stationary computerized equipment; wherein the communications circuitry is a wireless transceiver of the stationary computerized equipment; and wherein operating the communications circuitry includes:

transmitting the electronic message from the wireless transceiver of the stationary computerized equipment to the external security server.

7. A method as in claim 6 wherein receiving the user credential includes obtaining a set of current user authentication factors;

wherein performing the evaluation operation includes:

performing a comparison operation between the set of current user authentication factors and a set of expected user authentication factors, and outputting a comparison result indicating whether the set of current user authentication factors matches the set of expected user authentication factors; and wherein performing the remedial operation further includes:

transmitting an alert message from the electronic device to the external security server, the alert message (i) identifying the current geolocation of the electronic device and (ii) indicating that the counter which stores the current count of unsuccessful authentication attempts has reached the predefined threshold.

8. A method as in claim 3 wherein the electronic device is vehicle;

wherein the communications circuitry is a wireless transceiver of the vehicle; and wherein operating the communications circuitry includes:

transmitting the electronic message from the wireless transceiver of the vehicle to the external security server.

9. A method as in claim 2 wherein receiving the user credential includes obtaining a set of current user authentication factors; and wherein performing the evaluation operation includes:

performing a comparison operation between the set of current user authentication factors and a set of expected user authentication factors, and outputting a comparison result indicating whether the set of current user authentication factors matches the set of expected user authentication factors.

10. A method as in claim 2 wherein receiving the user credential includes obtaining a set of current user authentication factors; and wherein performing the evaluation operation includes:

performing a risk-based authentication operation which provides an electronic numerical risk score indicating an overall measure of riskiness based on aggregating sub-scores resulting from individual evaluations of the current user authentication factors, and outputting, as the electronic power control authentication result, a "success" message when the electronic numerical risk score is less than a predetermined risk threshold to indicate that authentication is successful and a "fail" message when the electronic numerical risk score is greater than the predetermined risk threshold to indicate that authentication is unsuccessful.

11. A method as in claim 1 wherein performing the remedial operation further includes:
   locking out the user to prevent the user from normally operating the electronic device until the electronic device receives a "proper reset" command.

12. A method as in claim 11, further comprising:
   receiving, as the "proper reset" command, a reset credential which is different from the user credential, and
   in response to the reset credential, resetting the counter and allowing the user to normally operate the electronic device.

13. A method as in claim 1 wherein performing the remedial operation further includes:
   transmitting an alert message from the electronic device to an external security server, the alert message (i) identifying a current location of the electronic device and (ii) indicating that the counter which stores the current count of unsuccessful authentication attempts has reached the predefined threshold.

14. A method as in claim 1 wherein prompting the user to input the user credential includes:
   visibly displaying a prompt that requests entrance of a password to turn off the electronic device, and
   in response to the prompt, receiving the user credential for use in authentication.

15. A method as in claim 1 wherein performing the remedial operation further includes:
   in response to the current count of unsuccessful authentication attempts stored by the counter reaching the predefined threshold, directing the electronic device to continuously ring as an alert that the electronic device has been stolen.

16. A method as in claim 1 wherein performing the remedial operation further includes:
   in response to the current count of unsuccessful authentication attempts stored by the counter reaching the predefined threshold, erasing data from the memory to prevent a thief in possession of the electronic device from having access to the data.

17. A method as in claim 1 wherein performing the evaluation operation on the user credential includes:
   sending an authentication request that includes the user credential to a remote authentication server, the remote authentication server being constructed and arranged to output the electronic power control authentication result in response to the authentication request.

18. An electronic device, comprising:
   location identification circuitry;
   memory; and
   control circuitry coupled to the location identification circuitry and the memory, the memory storing instructions which, when carried out by the control circuitry, cause the control circuitry to:
      receive a "turn off" command from a user of the electronic device, the "turn off" command directing the electronic device to turn off,
      in response to the "turn off" command, invoke an authentication operation to authenticate the user, the authentication operation providing an electronic power control authentication result indicating whether the electronic device considers the user to be an authorized operator of the electronic device, and
      perform a power control operation in response to the electronic power control authentication result, the power control operation (i) powering down the location identification circuitry when the electronic power control authentication result indicates that the electronic device considers the user to be an authorized operator of the electronic device, and (ii) maintaining power to the location identification circuitry when the electronic power control authentication result indicates that the electronic device considers the user not to be an authorized operator of the electronic device;
   wherein the control circuitry, when invoking the authentication operation, is constructed and arranged to:
      in response to the "turn off" command, prompt the user to input a user credential,
      after prompting the user, receive the user credential from the user and perform an evaluation operation on the user credential to determine whether the user is an authorized operator of the electronic device, and
      output the electronic power control authentication result based on the evaluation operation to indicate whether the electronic device considers the user to be an authorized operator of the electronic device;
   wherein the instructions further cause the control circuitry to:
      increment a counter which stores a current count of unsuccessful authentication attempts in response to each determination that the user is not an authorized operator of the electronic device,
      reset the counter in response to a determination that the user is an authorized operator of the electronic device, and
      perform a remedial operation when the current count of unsuccessful authentication attempts stored by the counter reaches a predefined threshold;
   wherein the memory of the electronic device stores firmware; and
   wherein the control circuitry, when performing the remedial operation, is constructed and arranged to:
      disable the electronic device from performing an upgrade to the firmware until the electronic device receives a "proper reset" command.

19. A computer program product having a non-transitory computer readable medium which stores a set of instructions to operate an electronic device, the set of instructions, when carried out by the electronic device, causing the electronic device to perform a method of:
   receiving a "turn off" command from a user of the electronic device, the "turn off" command directing the electronic device to turn off;
   in response to the "turn off" command, invoking an authentication operation to authenticate the user, the authentication operation providing an electronic power control authentication result indicating whether the electronic device considers the user to be an authorized operator of the electronic device; and
   performing a power control operation in response to the electronic power control authentication result, the power control operation (i) powering down location identification circuitry of the electronic device when the electronic power control authentication result indicates that the electronic device considers the user to be an authorized operator of the electronic device, and (ii) maintaining power to the location identification circuitry of the electronic device when the electronic power control authentication result indicates that the electronic device considers the user not to be an authorized operator of the electronic device, wherein invoking the authentication operation to authenticate the user includes:

in response to the "turn off" command, prompting the user to input a user credential, after prompting the user, receiving the user credential from the user and performing an evaluation operation on the user credential to determine whether the user is an authorized operator of the electronic device, and outputting the electronic power control authentication result based on the evaluation operation to indicate whether the electronic device considers the user to be an authorized operator of the electronic device;

the method further comprising:

incrementing a counter which stores a current count of unsuccessful authentication attempts in response to each determination that the user is not an authorized operator of the electronic device, resetting the counter in response to a determination that the user is an authorized operator of the electronic device, and performing a remedial operation when the current count of unsuccessful authentication attempts stored by the counter reaches a predefined threshold; and wherein performing the remedial operation includes:

disabling the electronic device from performing an upgrade to the set of instructions in the non-transitory computer readable medium until the electronic device receives a "proper reset" command.

\* \* \* \* \*